Aug. 16, 1949.　　　　　R. C. FOX　　　　　2,479,335
TIMING MIXER
Filed Oct. 24, 1946
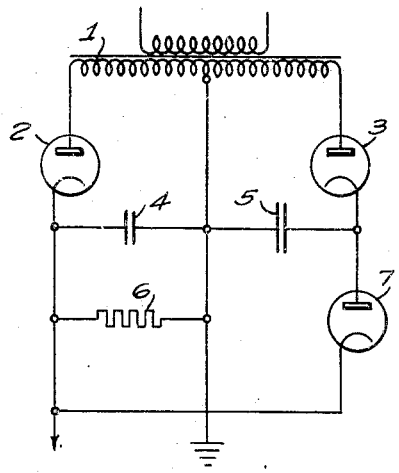
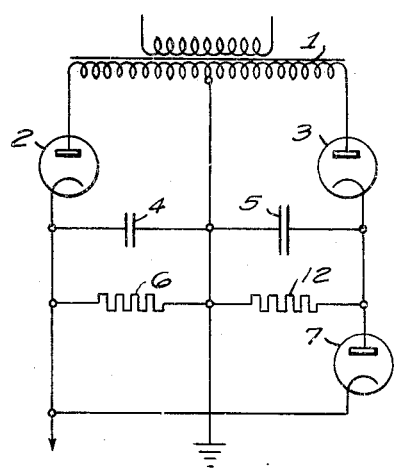
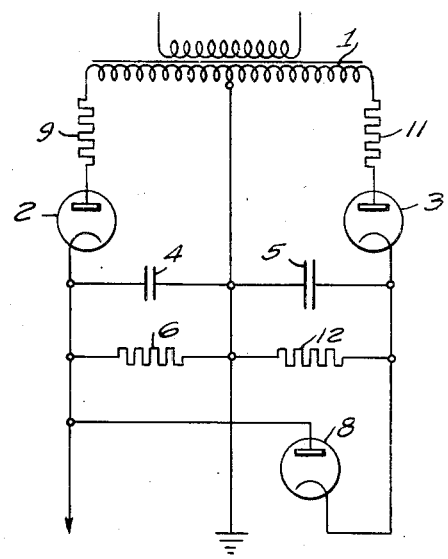
WITNESSES:
INVENTOR
Roy C. Fox.
BY
ATTORNEY Patented Aug. 16, 1949

2,479,335

UNITED STATES PATENT OFFICE 2,479,335

TIMING MIXER

Roy C. Fox, Baltimore, Md., assignor to Westinghouse Electric Corporation, East Pittsburgh, Pa., a corporation of Pennsylvania Application October 24, 1946, Serial No. 705,363

10 Claims. (Cl. 320—1)

My invention relates to electrical discharge tube circuits and, in particular, relates to a circuit arrangement in which a capacitor may be charged rapidly but caused to discharge very slowly; or, alternatively, the capacitor may be charged very slowly but discharged very rapidly.

Such arrangements are of use as control devices in many types of electric circuit; for example, they may cause current flow to start very quickly after the occurrence of some control-event, but to continue for a relatively long time after the termination of this event. To take one specific example, the arrangement is useful in a two-way telephone system in which the inception of speech at one station automatically switches certain transmission channels into action with high rapidity, but these channels are only deactivated by an interruption in the speech which is of considerable duration. The alternative arrangement is useful as a control device where it is desired that the occurrence of a control-event shall activate an electrical circuit only after a predetermined time delay, but the circuit shall be deactivated with high rapidity after the termination of the control-event.

In accordance with the prior art, electric circuits have been activated in quick response to inception of a control-event and deactivated only after an interval following the cessation of the control-event by charging a capacitor rapidly from a direct-current source to activate the controlled channel and allowing the capacitor to discharge slowly through a resistor to deactivate the channel. Theoretically, any desired ratio of the discharge time to the charge time of the condenser can be attained by making the impedance of the charging circuit low enough and by making the impedance of the discharge circuit high enough. However, in practice, it is often desirable to employ as a charging source a transformer secondary feeding the capacitor through a high-vacuum diode; and such diodes of a reasonable size and commercial type may have a resistance of the order of two thousand ohms. With reasonable commercial values of voltage and so on, this means that the charging current for the capacitor is limited in value, and if the capacitor is to charge rapidly, its size is correspondingly limited. If now the discharge time of such a small capacitor is desired to be made very great, a very large resistance must be connected in the discharge circuit.

To take as a specific instance the switching circuit for carrier telephone systems described in application Serial No. 705,362 entitled "Electronic transfer unit" of R. C. Fox and F. S. Beale, filed concurrently herewith and assigned to the Westinghouse Electric Corporation of East Pittsburgh, Pennsylvania, the ratio of the time interval preceding deactivation to the time of activation should be at least 300 to 1. Where it is desired that the capacitor be substantially charged in 1 microsecond through a 2000 ohm diode, this means that a resistance of the order of 600,000 ohms would be required in the capacitor discharge circuit. Such a resistance is impracticably large, may be greater than the leakance of many capacitors of moderate cost types, and may seriously interfere with the operation of the telephone circuit in respect to other components.

One object of my invention, is accordingly, to provide a circuit of a novel type in which the ratio of deactivation to activating time may be made as large as desired without the employment of uneconomically priced or otherwise impractical circuit components.

Another object of my invention is to provide a control unit in which the high ratio of deactivation time to activation time may be attained without the employment of undesirably high impedances.

Anther object of my invention is to provide a circuit for charging and discharging capacitors in which the ratio of the discharge time to the charge time may be made as high as desired without the employment of undesirably high impedances in the discharge circuit.

Still another object of my invention is to provide an arrangement in which the ratio of the deactivation time of the circuit to the activation time may be made as small as desired without suffering any of the detriments specified in the preceding objects.

Other objects of my invention will become apparent upon reading the following description, taken in connection with the drawing in which:

Figure 1 shows a preferred form of my invention adapted to charge rapidly a capacitor and slowly discharge it for so controlling a circuit that its time of deactivation is large compared with its time of activation;

Fig. 2 is a preferred circuit embodying the principles of my invention for slowly charging a capacitor but discharging it with high rapidity, thereby providing a control capable of causing the activation of a circuit to occur only slowly but the deactivation of the circuit to occur very quickly after the occurrence of a control-event; and Fig. 3 is a circuit diagram showing a modification of my invention.

Referring in detail to Fig. 1, I provide a transformer of conventional type having a secondary winding 1, the end terminals of which are connected to the anodes of a pair of rectifiers 2, 3. The cathode of the rectifier 2 is connected to the mid point of the secondary winding 1 through a capacitor 4, and the cathode of the rectifier 3 is connected to said mid point through a capacitor 5 which is of considerably larger capacity than the capacitor 4. The smaller capacitor 4 is shunted by a discharge resistor 6 and a rectifier 7 is connected with its cathode adjacent the cathode of rectifier 2 and its anode adjacent the cathode of rectifier 3. A control voltage, which rises rapidly to a peak when the transformer 1 is energized but decays very slowly after the deenergization of winding 1, may be derived and applied to any desired controlled circuit from the terminals of the resistor 6.

The mode of operation of the above-described circuit will now be explained. Immediately upon energization of the secondary winding 1, the rectifiers 2 and 3 start to charge the capacitors 4 and 5 with their remote terminals positive. However, since the capacitor 4 is of smaller value than the capacitor 5, the latter will charge much less rapidly than the former; hence the outer terminal of capacitor 4 will almost instantly become more positive than the outer terminal of capacitor 5. The polarity of the rectifier 7 is, however, such that no current can flow from capacitor 4 to capacitor 5, and the former can, accordingly, charge up to the full voltage supplied to it by the secondary winding 1 very quickly, while the capacitor 5 will only gradually rise to that voltage. Since the resistor 6 is connected across the capacitor 4, the voltage drop across its terminals rises with the same rapidity as the voltage of capacitor 4. In the course of time, the capacitor 5 will, however, charge up to the same voltage as capacitor 4.

If now the transformer winding 1 is deenergized, the capacitor 4 will begin discharging through resistor 6; but as soon as its voltage has fallen slightly, the terminal of resistor 6 adjacent the cathode of rectifier 2 will be less positive than the cathode of rectifier 3. Hence current will begin to flow through the rectifier 7 from capacitor 5, and thereafter the capacitors 4 and 5 are, in effect, connected in multiple to the discharge resistor 6. The rate at which the voltage drops across the terminals of the resistor 6 is, accordingly, dependent upon the time constant of the circuit, including the aggregate capacity of capacitors 4 and 5 in multiple with each other discharging through the resistor 6. Since the resistor which will discharge a large capacitor in a given time may be much smaller than the resistor which would discharge a small capacitor in the same time, it is obvious that the resistor 6 may be much smaller for a given discharge time than would be the case if the capacitor 4 alone were discharging through it. On the other hand, the rate at which voltage rises at the terminals of the resistor 6 is fixed exclusively by the rate at which the small capacitor 4 can charge through the resistance of rectifier 2; and since the capacitor 4 may be made as small as desired, the rapidity with which the voltage across the resistor 6 rises following energization of the winding 1 may be made as high as desired.

In short, the rate of voltage rise across resistor 6 is determined solely by the capacitor 4 and rectifier 5, while the rate of fall of voltage across the terminals of resistor 6 is determined solely by the aggregate of capacitor 4 and capacitor 5 discharging through the resistor 6. Since the rate of voltage rise and the rate of voltage fall depend upon separate and independent factors, the two rates may be fixed independently of each other by properly proportioning the separate circuit constants above mentioned.

Referring now to Fig. 2, the latter is the converse arrangement of Fig. 1, in that it is adapted to cause a slow rise in voltage across the terminals of resistor 6 in combination with a rapid fall in that voltage upon deenergization of winding 1. The only difference between Figs. 1 and 2 is that the rectifier 8 of Fig. 2 has an opposite polarity to rectifier 7 of Fig. 1. Thus the energization of transformer winding 1 begins to charge capacitor 4 through rectifier 2, and rectifier 8 is of such polarity that capacitor 5 immediately begins to draw part of the charging current through rectifier 2, so that, in effect, capacitors 4 and 5 are connected in parallel with each other during the charging period. The resistors 9 and 11, in series with the rectifiers 2 and 3, determine the rate at which the capacitors 4 and 5 charge, and hence the time required for these capacitors to reach the peak voltage supplied by winding 1 can be set at any figure desired.

However, upon deenergization of winding 1, capacitor 4 will begin to discharge through resistor 6 and capacitor 5 through resistor 12. The magnitude of resistor 12 should be such that the time constant of networks 4—6 is lower than that of network 5—12. The terminal of resistor 6 which is adjacent rectifier 2 will, accordingly, immediately become less positive than the terminal of capacitor 5 which is adjacent rectifier 3. The polarity of rectifier 8 will then be seen to be such that capacitor 5 cannot discharge through resistor 6. The rate at which capacitor 4 discharges is, accordingly, fixed by the time constants of capacitor 4 and resistor 6, and by making the value of capacitor 4 and resistor 6 small enough, the time of discharge of capacitor 4 may be made as small as desired.

It is thus evident that by the arrangement of Fig. 2, the rate at which the voltage difference between the terminals of resistor 6 rises may be made as small as desired by making the aggregate capacity of capacitors 4 and 5 large enough so that they charge with desired slowness through the resistors 9 and 11; but the rate at which that voltage drop falls after deenergization of winding 1 can be made as small as desired by giving capacitor 4 and resistor 6 sufficiently small value.

The magnitudes of capacitor 5 and resistor 12 are determined by the rate at which it is desired that the controlled circuit pick up for control-events occurring at short intervals. For example, where the circuit shown in Fig. 2 is used for controlling a telephone communication system, it is desirable that after the speaker stops talking to breathe, the controlled circuit pick up quickly when he starts to talk again. However, when the speaker has stopped talking and is waiting for the other party to talk, it is essential that the controlled circuit shall not be actuated from the speaker's Fig. 2 circuit (by reason of stray or background noises) before the other party has started to talk. This differentiation is accomplished by properly dimensioning resistor 12 once condenser 5 has been set.

It will be evident that by deriving the control voltage from resistor 12 instead of resistor 6 in Fig. 2, a voltage is obtained that rises to maximum in the comparatively slow time-rate at which large capacitor 5 charges, and which subsequently falls at the similarly slow rate at which capacitor 5 discharges. Thus two control voltages, one with a slow rise but rapid fall, and the other with a slow rise and slow or moderate fall-time are obtainable from the same network.

The circuit shown in Fig. 3 provides two different control characteristics, both fast pick-up slow release and slow pick-up slow release. This circuit is similar to the circuit shown in Fig. 1 except that it includes resistor 12 in parallel with capacitor 5. A control pulse for fast pick-up slow release may be derived from the junction of the cathode of tube 2 and the capacitor 4 as in the Fig. 1 embodiment. The other control pulse may be derived at the junction of the cathode of tube 3 and the capacitor 5. The slow pickup is attained because capacitor 5 is large. Resistor 12 should be properly proportioned. The release time for both pulses is the same; one very slow pick-up and medium duration release; the other very slow pick-up fast release. The duration for very slow pick-up for both pulses is the same.

I claim as my invention:

1. In combination, two alternating-current sources, a first capacitor shunted by a resistor connected to be charged through a rectifier by one of said sources, a second capacitor connected to be charged through a second rectifier by the other of said sources, means for connecting together terminals of said capacitors which, when said capacitors are charged, have like polarity, and a rectifier path shunted between the other terminals of said capacitors.

2. In combination, two alternating-current sources, a first capacitor shunted by a resistor connected to be charged through a rectifier by one of said sources, a second and larger capacitor connected to be charged through a second rectifier by the other of said sources, means for connecting together terminals of said capacitors which, when said capacitors are charged, have like polarity, and a rectifier path shunted between the other terminals of said capacitors.

3. In combination, two alternating-current sources, a first capacitor shunted by a resistor connected to be charged through a rectifier by one of said sources, a second capacitor connected to be charged through a second rectifier by the other of said sources, means for connecting together terminals of said capacitors which, when said capacitors are charged, have like polarity, and a rectifier path shunted between the other terminals of said capacitors, the polarity of the last-mentioned rectifier being such that the second capacitor can receive no charging current from the first capacitor.

4. In combination, two alternating-current sources, a first capacitor shunted by a resistor connected to be charged through a rectifier by one of said sources, a second and larger capacitor connected to be charged through a second rectifier by the other of said sources, means for connecting together terminals of said capacitors which, when said capacitors are charged, have like polarity, and a rectifier path shunted between the other terminals of said capacitors, the polarity of the last-mentioned rectifier being such that the second capacitor can receive no charging current from the first capacitor.

5. In combination with an alternating-current transformer, a pair of rectifiers having like terminals connected to the end terminals of the secondary winding of said transformer, the other terminals of said rectifiers being connected to each other through two capacitors in series, a connection from the common terminal of said capacitors to the midpoint of said secondary winding, a resistor spanning one of said capacitors, and a third rectifier interconnecting the non-adjacent terminals of said capacitors.

6. In combination with an alternating-current transformer, a pair of rectifiers having like terminals connected to the end terminals of the secondary winding of said transformer, the other terminals of said rectifiers being connected to each other through two capacitors of different size in series, a connection from the common terminal of said capacitors to the midpoint of said secondary winding, a resistor spanning the smaller one of said capacitors, and a third rectifier interconnecting the non-adjacent terminals of said capacitors.

7. In combination with an alternating-current transformer, a pair of rectifiers having like terminals connected to the end terminals of the secondary winding of said transformer, the other terminals of said rectifiers being connected to each other through two capacitors of different size in series, a connection from the common terminal of said capacitors to the midpoint of said secondary winding, a resistor spanning the smaller one of said capacitors, and a third rectifier interconnecting the non-adjacent terminals of said capacitors, the polarity of said third rectifier being such that said small capacitor cannot send charging current through it to said larger capacitor.

8. In combination with an alternating-current transformer, a pair of rectifiers having like terminals connected to the end terminals of the secondary winding of said transformer, the other terminals of said rectifiers being connected to each other through two capacitors of different size in series, a connection from the common terminal of said capacitors to the midpoint of said secondary winding, a resistor spanning the smaller one of said capacitors, and a third rectifier interconnecting the non-adjacent terminals of said capacitors, the polarity of said rectifier being such that said larger capacitor cannot send charging current through it to said smaller capacitor.

9. In combination, a first capacitor and a second capacitor, a circuit of high time constant charging one of said capacitors and a circuit of low time constant for charging the other of said capacitors, a discharge circuit shunted across the terminals of said first capacitor, means for connecting together terminals of said capacitors which, when said capacitors are charged, have like polarity, and a rectifier path shunted between the other terminals of said capacitors.

10. In combination with a first capacitor, a second capacitor of larger size, means for charging both said capacitors with direct current, the second capacitor reaching substantially full charge more slowly than said first capacitor, a discharge circuit shunted across the terminals of one of said capacitors, means for connecting together terminals of said capacitors which, when said capacitors are charged, have like polarity, and a rectifier path shunted between the other terminals of said capacitors.

ROY C. FOX.

REFERENCES CITED

The following references are of record in the file of this patent:

UNITED STATES PATENTS

| Number | Name | Date |
| --- | --- | --- |
| 2,110,015 | Fitzgerald | Mar. 1, 1938 |
| 2,392,632 | Berry | Jan. 8, 1946 |